Feb. 5, 1957　　B. R. THOMPSON ET AL　　2,780,709
CONTACT METER

Filed May 13, 1953　　　　　　　　　　　　　3 Sheets-Sheet 1

*INVENTORS*
BRADLEY R. THOMPSON
BY JOHN D. SAINT-AMOUR

ATTORNEY

Feb. 5, 1957 B. R. THOMPSON ET AL 2,780,709
CONTACT METER
Filed May 13, 1953 3 Sheets-Sheet 2
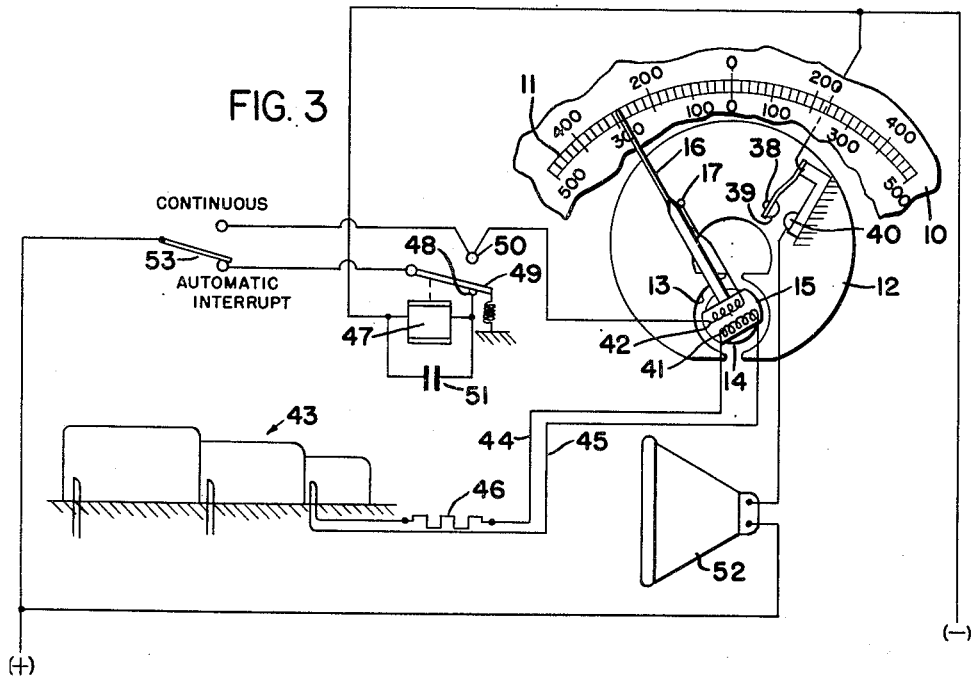
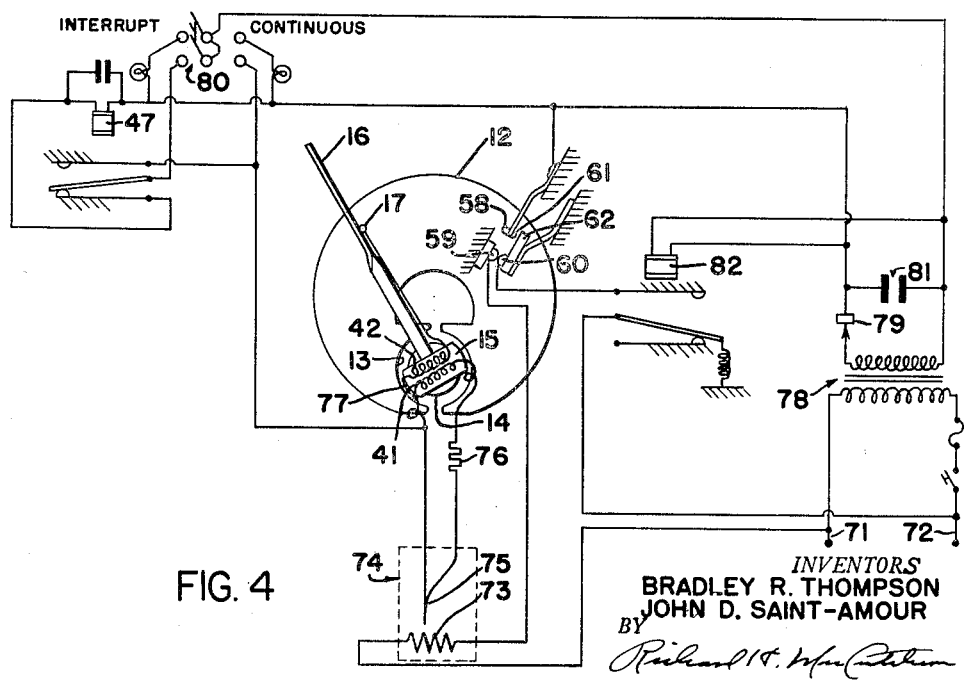
INVENTORS
BRADLEY R. THOMPSON
JOHN D. SAINT-AMOUR
BY
Richard H. MacCatchen
ATTORNEY

INVENTORS
BRADLEY R. THOMPSON
JOHN D. SAINT-AMOUR
ATTORNEY

United States Patent Office 2,780,709
Patented Feb. 5, 1957

2,780,709
CONTACT METER

Bradley R. Thompson, South Euclid, and John D. Saint-Amour, Solon, Ohio, assignors to Assembly Products, Inc., Chagrin Falls, Ohio, a corporation of Ohio Application May 13, 1953, Serial No. 354,816

3 Claims. (Cl. 219—20)

Our invention relates to improvements in electric contact devices and has particular significance in connection with contact making pointer meters of the D'Arsonval type.

Heretofore, D'Arsonval type meters, which are characterized by having a small movable coil operating within a permanent magnet frame, have been used in applications where the meter is provided with cooperating contacts for making or breaking an electrical circuit when a predetermined coil position is reached. While such meters have the advantage of extreme sensitivity to minute changes in electrical condition being measured, there has been a disadvantage in that the current carrying capacity and also the voltage rating of contacts so used is very seriously limited. The coil movement is generally restrained by hair springs and pivoted in small jewelled bearings and the use of such delicate parts limits the weight of contact which can be carried on the rotatable assembly, while the small spaces present limit the permissible voltage insulation.

It is an object of the present invention to provide simple and inexpensive means for overcoming the above mentioned difficulties.

A further object of the present invention is to provide an improved contact meter in which output voltage and current are substantially independent of the physical requirements of the major moving portion of the meter.

Other objects and advantages will become apparent and the invention will be better understood from consideration of the following description taken in connection with the accompanying drawings in which:

Fig. 3 is a schematic illustration of a circuit utilizing a meter provided with the invention for furnishing bearing temperature warning control;

Fig. 4 is a schematic illustration showing a modification used for furnishing temperature control for a small furnace.

Figure 1:
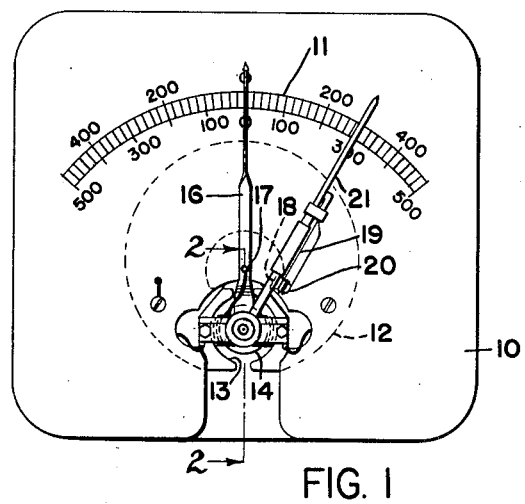
Fig. 1 is a front face view of a contact meter provided with the invention.
Figure 2:
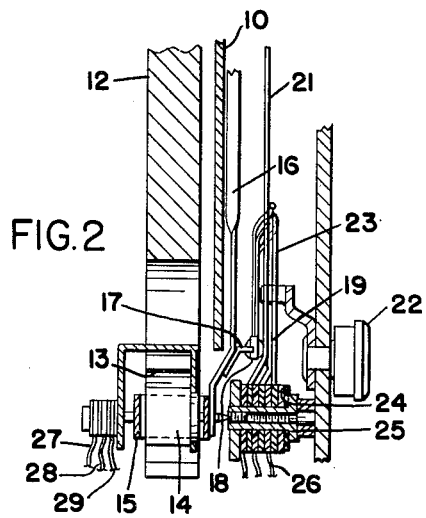
Fig. 2 is a diagrammatic representation of a partial enlarged cross-section along the line 2—2 of Fig. 1.

Referring now to Fig. 1, 10 is a meter face plate provided with a graduated scale 11, and 12 is a permanent magnet field producing piece having an annular opening 13 in which is mounted a stationary core 14. Rotatable about the core 14 and between it and the magnet 12 is a movable coil assembly 15. As is conventional for such type meters, and as described in U. S. Patent 2,576,371, issued November 27, 1951, upon an application filed by Bradley R. Thompson and George E. Hammond, the coil assembly is mounted on steel pivots turning in jewelled bearings responsive to interaction of coil current and permanent magnet field, with this action restrained by hair springs which may also serve to carry current to and from the movable coil assembly. A pointer 16 is mounted for movement with coil assembly 15 and carries a contact 17. Contact 17 is designed to mate with a contact 18, which like additional contacts 19 and 20, is spring mounted on a relatively stationary member which in Figs. 1 and 2 comprise an additional pointer 21 manually adjustable by turning a knob 22 (Fig. 2).

As more fully explained in connection with Figs. 3 and 4, the coil assembly is provided with two coils, one of which is responsive to initial signal, and the other of which provides an additional locking torque upon the closure of contacts 17 and 18 (sometimes referred to as locking contacts) to increase the pressure between these contacts, and, in connection with the present invention, to provide an additional function as will hereinafter become more apparent. Upon the mating of contacts 17 and 18, with the arrangement shown in Figs. 1 and 2 continued movement of the coil assembly and pointer 16 will bias spring mounted contact 18 to the right to engage contact 19 which cooperates with contact 20 to close a circuit which will hereinafter be referred to as the load circuit. Contacts 18, 19 and 20 are all spring mounted on the relatively stationary pointer 21 and insulated from each other. Leads 23 extend from these contacts and, as indicated in Fig. 2, they may be conducted radially inward along the pointer 21 and engage slip rings 24 located about an insulated central shaft 25 and then terminate in stationary leads 26. Additional connections 27—29 conduct current to and from contact 17 and the various parts of the movable coil assembly. It is to be understood that these connections may conduct current through hair springs, or slip rings, or merely through loose leads, though we have found it desirable to use hair springs and use the same springs to provide mechanical restraining torque (i. e., zero return).

Referring now to Fig. 3, like parts have been like numbered as in Fig. 1. However, in Fig. 3 no relatively stationary pointer is shown and it is assumed that a locking contact 38 and a pair of load contacts 39 and 40 are mounted on a base associated with the frame or case of the instrument (not shown), contact 40 being solidly mounted thereon, although insulated therefrom, and contacts 38 and 39 being mounted on a single spring to be supported though insulated from this base. As previously intimated, the moving coil assembly 15 comprises two coils, 41 and 42. 43 represents a turbine generator having bearing thermocouples connected by electrical conductors to a plurality of similar meters. To such leads are 44 and 45 which lead from an exciter end bearing thermocouple to meter coil 41. If desired, a resistance 46 may be included in the circuit to compensate for the length of the leads and to provide needle movement dampening. The locking coil 42 is connected in series with contact 17 which is designed to mate with contact 38, and these contacts and the locking coil are arranged in series with a source of power provided by lines marked (+) and (—). If desired, and as described in the above mentioned patent, the locking circuit may be broken by an interrupter comprising a relay having a coil 47, normally closed contacts 48—49 and normally open contacts 49—50, with the action of the relay delayed by a capacitor 51 connected across its coil, and with connections between the source of power and the relay coil and including the normally closed contacts to provide means for breaking the coil energizing circuit when the relay picks-up, together with connections through the normally open contacts so that only when the relay is energized will it establish a circuit to the locking coil 42 of the movable coil assembly. In the circuit shown in Fig. 3, the meter load (or booster) contacts 39 and 40 are connected in series with the source of power and a howler 52, which serves to warn of high bearing temperature and thus, through the pre-supposed intervention of a human attendant, to control such temperature. If desired, a double throw switch 53 may be provided to cut out the relay 47—50 when continuous rather than automatic interrupting action is desired.

Referring now to Fig. 4, we have shown a modification in which a pair of load contacts 59 and 60 are normally closed but arranged to be biased apart by the closing of locking contacts 17 and 58, respectively. To this end, the contact 59 may be solidly mounted on the case of the meter, though insulated therefrom, the contact 60 spring mounted on the case for normal engagement with contact 59 but with means provided for the opening of these load contacts by movement of locking contact 58. As shown, contact 58 in common with a mechanical (non-electrical) contact 61 is spring mounted with respect to the case and contact 61 arranged to engage a portion of supporting insulation 62 associated with contact 60. The normally closed load contacts 59—60 are connected in circuit with a source of power provided by A. C. lines 71, 72 and in series with a heating coil 73 of a small electric furnace 74, the temperature of which is to be controlled. The furnace is provided with a thermocouple 75 connected through a compensating resistance 76 to the meter coil 41. In order to reduce the number of hair springs or other moving contact members required for the moving coil assembly, coils 41 and 42 are joined by a lead 77.

The arrangement of Fig. 4 is much like that of the above mentioned patent but it will be observed that the use of auxiliary booster contacts (i. e. load contacts 59 and 60) has eliminated the need for one relay and greatly simplified the circuit. As in the patent, a supplementary source of power comprises an isolating transformer 78, the primary of which is connected to the alternating current lines 71—72, and the secondary of which is connected through a rectifier element 79 with a two pole, two position switch 80 which serves, when in the "Automatic Interrupt" position, to momentarily energize the interrupter relay coil 47. When 47 is picked up, locking coil 42 is energized whenever the meter locking contacts 17 and 58 are in engagement. To secure a more even source of electrical energy, a capacitor 81 may be placed across the auxiliary power output from the secondary of transformer 78, and as shown in the patent, an additional relay may have its coil 82 placed across this auxiliary power line so that, through the medium of its associated contacts, it will interrupt the circuit through the load contacts and furnace heating coil 73 if, for any reason, the auxiliary power fails.

Figure 5:
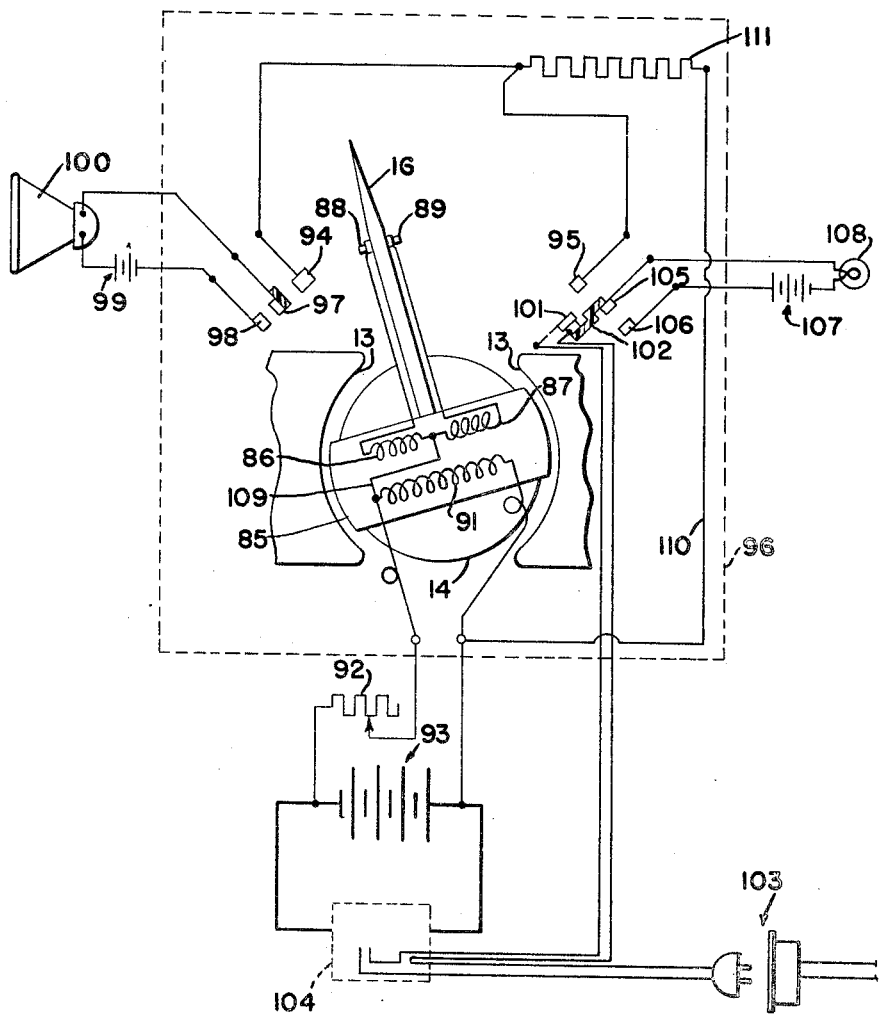
Fig. 5 is a schematic illustration showing a modification used in a battery charging control circuit.

In Fig. 5 a contact device of the galvanometer type is provided with both high limit and low limit locking and booster contacts. Because desired locking torque is in opposite directions for the two limits of travel, the moving coil assembly 15 is provided with two oppositely wound locking coils 86 and 87 connected through a common lead to each other and each connected to a different one of two insulated contacts, 88 and 89 respectively, mounted on opposite sides of the movable pointer 16. The moving assembly has a sensitive coil 91 which is connected through a calibrating resistance 92 to a battery 93, charge of which is controlled by the arrangement. Moving contacts 88—89 cooperate with stationary contacts 94, 95, respectively. The latter are mounted on case 96 of the device in such manner that there is one set of locking contacts at each limit of travel. The device, which may be a meter instrument or may simply be a rotatable coil relay with no indicating function, is also provided with normally open booster contacts 97—98 operated by the contact 94 and arranged in series with a potential source 99 to operate a siren 100 upon the unlikely occurrence of battery voltage reaching an abnormal low, and is also provided with normally closed booster contacts 101, 102 operated by the contact 95 to break the circuit from a source of power, indicated schematically by a plug and receptacle 103, to a battery charger 104 connected to charge battery 93 whenever pointer 16 is below the high limit. Also the device is shown with normally open high limit booster contacts 105, 106 operated by the contact 95 and arranged in series with a power source 107 to indicate, as by energizing a light 108, that the battery 93 is fully charged. In the arrangement shown the same battery 93 provides locking power through a circuit traceable through calibrating resistance 92, leads 109 and 110, a current limiting resistor 111 and the locking contacts and coil for either limit.

An advantage of the arrangement of Fig. 5 is that the customer is not required to furnish or wire any relays because the booster contacts which may be hermetically sealed by the enclosure of the main device perform all desired indicating and load circuit functions, at least for reasonable values of charging current, for example not exceeding one ampere in the charger high voltage input. Thus all moving parts, except calibrating resistance, are enclosed at the factory and against any corrosive ambients apt to be encountered during use.

In operation, with any of the arrangements above illustrated and described, greater contact capacity (internally of the meter itself) is offered than with any prior art arrangements. Thus, the invention provides a new design freedom since the meter load contacts are not limited by the current carrying capacity of elements of the main moving system of the meter. In addition, with the arrangement of the invention, the locking contacts are freed from load currents so that these locking contacts can be designed for optimum operation in the single circuit in which, according to the invention, they are used. That is, they may be given the lowest possible surface resistance, and their small size and weight will still be compatible with adequate protection from arcing and corrosion because they are electrically divorced from the load circuits. On the other hand, the load contacts are independent of the moving system even though they are activated by it and, since they will be closed with considerable pressure provided by the locking coil, surface resistance of these load contacts is not so important and for them there can be chosen a contact alloy which will withstand arcing and carry heavy currents and operate at high voltages. It will be seen from the drawing that, with the various arrangements of the invention, it is very simple to isolate the load circuit from the input circuit without the use of additional hair springs. There is thus provided a device of the character described, capable of meeting the objects above set forth.

While we have illustrated and described particular embodiments, various modifications may obviously be made without departing from the true spirit and scope of the invention which we intend to define in the appended claims.

We claim:

1. In an electric control system for indicating and controlling temperature, a thermocouple responsive to the temperatures to be controlled, an ammeter having a moving coil, connections between said coil and said thermocouple whereby said coil is energized and moved in response to changes in temperature in the region of the thermocouple, a source of power, an indicator secured to said moving coil, a case for said ammeter, a resilient element having one end thereof relatively fixed with respect to said case and having an opposite end, cooperating first and second contacts with the first carried by said indicator and the second mounted upon said resilient element's opposite end, a second coil movable with the first named coil, a circuit between said source of power and said second coil and including said first and second contacts whereby the meeting of said contacts will energize said second coil and apply a contact closing torque to said movable indicator, an electrical relay having a solenoid coil and having contacts interposed in the circuit to said second coil, connections between said relay coil and said source of power, said relay including means to break said last named connections when the relay becomes energized and to establish the circuit to the second named coil, means to return the relay, means to retard the opening and closing movements of said relay, cooperating third and fourth contacts one of which is resiliently mounted on said case and arranged to be mechanically actuated into or out of engagement with the other by movement of the resilient element's opposite end upon which the second contact is mounted, and electrically controlled means for correcting predetermined temperature conditions in the region of the thermocouple with said last means connected in series through said third and fourth contacts with said source of power.

2. In an electric control system for indicating and controlling a condition, a device producing an electric current in response to a change in the condition, an ammeter having a moving coil, connections between said coil and said device whereby said coil is energized and moved in response to changes in the condition, an indicator secured to said moving coil, a case for said ammeter, a resilient element having one end thereof relatively fixed with respect to said case and having an opposite end, cooperating first and second contacts with the first carried by said indicator and the second mounted upon one side of said resilient element's opposite end, a second coil movable with the first named coil, a source of power, a circuit between said source of power and said second coil and including said first and second contacts whereby the meeting of the contacts will energize said second coil and apply a contact closing torque to said movable indicator, cooperating third and fourth contacts, said third contact being mounted on the other side of said resilient element's opposite end and arranged to be mechanically actuated into or out of engagement with said fourth contact by movement of said resilient element's opposite end, and electrically controlled means for correcting pre-determined conditions connected to said third and fourth contacts in series with said source of power.

3. A contact device comprising a frame, a polarized permanent magnet mounted in said frame and having an annular opening between the opposite poles of the magnet, an assembly pivotally mounted with respect to the frame for rotation within said annular opening and comprising a first coil and a second coil adapted to rotate said assembly upon passage of current through either coil, a pointer mounted to move with said assembly, a first contact carried by said pointer, a contact mounting member on said frame, a resilient element having a first end fixed to said contact mounting member, said resilient element having a free end, a pair of contacts electrically insulated from each other mounted respectively on opposite sides of said resilient member adjacent the free end thereof, one of said pair of contacts being engageable by said first contact, a locking circuit connected to energize said second coil upon engagement of said first and said one of said pair of contacts to apply an additional torque to rotate said pointer and thereby move said free end of said resilient element, and a fourth contact mounted on said contact mounting member at a location whereat said fourth contact is engaged by the other of said pair of contacts after a pre-determined movement of said resilient element.

References Cited in the file of this patent

UNITED STATES PATENTS

| | | |
|---|---|---|
| 922,780 | Kitsee | May 25, 1901 |
| 1,246,430 | Hopkins et al. | Nov. 13, 1917 |
| 1,512,008 | Otis | Oct. 14, 1924 |
| 1,858,267 | Eames | May 17, 1932 |
| 2,042,109 | Lamb | May 26, 1936 |
| 2,109,872 | Uehling | Mar. 1, 1938 |